United States Patent [19]

Funatsu et al.

[11] 4,301,049

[45] Nov. 17, 1981

[54] METHOD OF PRODUCING AN AZO PIGMENT SUITABLE FOR USE IN A GRAVURE PRINTING INK AND AZO PIGMENTS PRODUCED THEREBY

[75] Inventors: Takenori Funatsu; Masuhiko Maejima; Yoichi Inuzuka; Kosaku Tsuji, all of Fuji, Japan

[73] Assignee: Toyo Ink Mfg. Ltd., Tokyo, Japan

[21] Appl. No.: 145,626

[22] Filed: May 1, 1980

[30] Foreign Application Priority Data

May 18, 1979 [JP] Japan .................................. 54/60519

[51] Int. Cl.$^3$ ..................... C09D 11/02; C09D 11/06
[52] U.S. Cl. .................. 260/23 AR; 106/20; 106/27; 106/30; 106/219; 106/241; 106/308 N; 106/308 F; 106/308 M; 260/23 S; 260/24; 260/27 R; 260/DIG. 38
[58] Field of Search ............. 260/23 S, 23 AR, 27 R, 260/24, DIG. 38; 106/20, 27, 30, 219, 241, 308 N, 308 F, 308 M

[56] References Cited

U.S. PATENT DOCUMENTS

| | | | |
|---|---|---|---|
| 2,327,594 | 8/1943 | Erickson et al. | 106/30 |
| 2,346,968 | 4/1944 | Jeuck et al. | 106/27 |
| 2,350,523 | 6/1944 | O'Neal | 106/27 |
| 2,733,155 | 1/1956 | Williams et al. | 106/30 |
| 3,412,053 | 11/1968 | Pugliese | 106/219 |
| 3,945,836 | 3/1976 | Miyata | 106/30 |
| 4,079,026 | 3/1978 | Mone | 106/30 |
| 4,191,670 | 3/1980 | Strauch et al. | 106/308 F |
| 4,204,871 | 5/1980 | Johnson et al. | 106/20 |
| 4,220,473 | 9/1980 | Robertson | 106/308 N |

FOREIGN PATENT DOCUMENTS

48-1821 1/1973 Japan .
1356254 6/1974 United Kingdom .

*Primary Examiner*—Ronald W. Griffin
*Attorney, Agent, or Firm*—Kenway & Jenney

[57] ABSTRACT

An azo pigment suitable for use in gravure printing ink is produced by treating 100 parts by weight of a starting azo pigment with from 1 to 30 parts by weight of an amine, from 0.1 to 0.5 equivalent of a fatty acid and/or rosin or a derivative thereof, based on the amine, and from 0.5 to 50 parts by weight of a resin containing carboxyl groups and having an acid value of at least 50. The thus-produced azo pigment may be formulated in gravure printing ink, which exhibits improved gloss, flowability and aging discoloration characteristics. Such an ink practically does not penetrate through even when printed on cheap paper or uncoated paper.

12 Claims, No Drawings

METHOD OF PRODUCING AN AZO PIGMENT SUITABLE FOR USE IN A GRAVURE PRINTING INK AND AZO PIGMENTS PRODUCED THEREBY

BACKGROUND OF THE INVENTION

1. Field of the Invention

The present invention relates to a method of producing an azo pigment, more particularly to a method of producing an azo pigment which can be used to prepare printing inks of excellent quality.

2. The Prior Art

Heretofore, there have been proposed a number of methods of treating pigments with surface active agents, resins and various additives in an attempt to provide pigments for use in printing inks. Such methods include, for example, adding to pigments amphoteric surface active agents, anionic surface active agents, emulsions or the like, or treating pigments with aliphatic amines (see, for example, Japanese Patent Publication No. 1821/1973). Although the former method is effective in improving the gloss of the printing ink, the thus-produced pigment is disadvantageous in that the use thereof reduces the flowability of the resulting printing inks. On the other hand, the pigment obtained by the latter method improves the adaptability of printing inks but has drawbacks, in that, after formulation of a printing ink, a substantial degree of discoloration occurs as time goes on, leading to a reduction in brightness, gloss and color strength.

Furthermore, when pigments obtained by the previously proposed methods are used to make a gravure printing ink and the resulting ink is printed on cheap paper, ink penetration occurs ("strike-through"), ink penetrating to the opposite side of the paper sheet, thus presenting the problem that the printed matter is stained or that duplex printing is not possible. In recent years, there has been a strong demand for lowering the cost of producing prints by using cheap paper instead of expensive coated paper of high quality. Accordingly, there is a long-felt want and demand for a pigment suitable for use in making a printing ink which is free of the problem of ink penetration, which tends to occur on cheap paper.

SUMMARY OF THE INVENTION

In order to solve the various prior-art problems, we have made an intensive study and, as a result, developed a method of producing an azo pigment suitable for formulation in printing inks of excellent quality, particularly a gravure ink, which can solve the various problems including ink penetration.

According to the present invention there is provided a method of producing an azo pigment suitable for use in a gravure printing ink, which method comprises treating 100 parts by weight of an azo pigment with from 1 to 30 parts by weight of an amine, from 0.1 to 0.5 equivalent of a fatty acid and/or rosin or a derivative thereof, based on the amine, and from 0.5 to 50 parts by weight of a resin containing carboxyl groups and having an acid value of at least 50. The present invention also provides azo pigments produced by the method, as well as gravure printing ink, paint and oil-based ink containing such an azo pigment.

Thus, the present invention provides, in one aspect, a method of producing an azo pigment, in which 100 parts by weight of an azo pigment are treated with, in combination, from 1 to 30 parts by weight of an amine, from 0.1 to 0.5 equivalent of a fatty acid and/or rosin or a derivative thereof, based on the amine, and from 0.5 to 50 parts by weight of a resin containing carboxyl groups and having an acid value of at least 50, preferably in the range of from 100 to 200.

The starting azo pigments to be used in the method of the present invention include those which are obtainable by diazotizing various aromatic amines, such as o- (or m- or p-) chloroaniline, o- (or m- or p-) toluidine, α-naphthylamine, β-naphthylamine, 3,3′-dichlorobenzidine, 3,3′-dianisidine, tetrachlorobenzidine, p-toluidine-m-sulfonic acid, o-nitro-p-toluidine, 2-methoxy-5-nitroaniline, 2-methyl-5-nitroaniline, o-chloro-p-nitroaniline, 3-amino-4-methoxybenzamide, 3-amino-4-methylbenzamide, 2-methoxy-5-N-phenylcarbamoylaniline, 2-amino-4-N,N-diethylsulfamoylanisole, 2-amino-4-benzylsulfonylanisole, 2,4,5-trichloroaniline, 2-nitro-4-chloroaniline, 2-amino-5-sodiumsulfonate-nitrobenzene, sulfanilic acid, anthranilic acid, 2,5-dichloroaniline, 4-chloro-3-cyanoaniline, 2,6-dichloro-4-nitroaniline, 2,5-diethoxyaniline and 2-methoxy-4-nitroaniline. The diazo compound is reacted with a coupler, such as acetoacetanilide, o- (or m- or p-) chloroacetoacetanilide, acetoacet-o-toluidide, acetoacet-o-anisidide, acetoacet-m-xylidide, acetoacet-2,5-dimethoxy-4-chloroanilide, acetoacet-p-anisidide, acetoacet-5-chloro-2-anisidide, acetoacet-5-chloro-2-toluidide, acetoacet-p-toluidide, 1-phenyl-3-carboethoxy-5-pyrazolone, 1-phenyl-3-methyl-5-pyrazolone, 1-tolyl-3-methyl-5-pyrazolone, acetoacet-2,5-dimethoxyanilide, naphthoanilide, β-naphthol and 2-hydroxy-naphthalene-3-carboamide. Of these, acetoacetanilide-base azo pigments are preferred.

The amines employable in the present invention are not limited to any specific amines and include, for example, monoamines having the general formula:

(1)

in which $R_1$ represents an alkyl or substituted alkyl group containing from 8 to 24 carbon atoms and $R_2$ and $R_3$ represents, independently, a hydrogen atom or an alkyl group containing from 1 to 14 carbon atoms, and diamines having the general formula:

(2)

in which $R_4$ represents an alkyl or substituted alkyl group containing from 8 to 24 carbon atoms, and $R_5$ represents an alkylene group containing from 1 to 4 carbon atoms. Specific examples of compounds of the formulae (1) and (2) include caprylamine, octylamine, laurylamine, dimethyloctylamine, dimethyllaurylamine, diethyllaurylamine, dimethylmyristylamine, tricaprylamine, dimethylstearylamine, methyldilaurylamine, dimethylbenzylamine, stearylpropylenediamine, laurylpropylenediamine and octylpropylenediamine.

The fatty acids usable in combination with such amines are those represented by the formula $R_6$—COOH, in which $R_6$ represents an alkyl or substituted alkyl group containing from 6 to 24 carbon atoms and include, for example, caproic acid, caprylic acid, capric acid, lauric acid, myristic acid, palmitic acid, stearic acid and oleic acid. Fatty acids containing from 6 to 14 carbon atoms are particularly preferred.

As exemplary of the rosin or derivatives thereof mentioned above, there may be mentioned rosin, albietic acid, polymerized rosin and hydrogenated rosin, which have a molecular weight below 2,000.

Among resins containing carboxyl groups and having an acid value of at least 50, preferably in the range of from 100 to 200, and usable in combination with the amine and the fatty acid and/or rosin or derivative thereof, there are, for example, synthetic resins having a number average molecular weight in the range of from 2,000 to 150,000, preferably from 10,000 to 100,000, or partially esterified products thereof such as acrylic acid, acrylic-maleic acid resin, styrene-maleic acid resin, rosin-modified maleic acid resin, styrene-methacrylic acid resin or partially esterified products thereof.

In the present invention, from 1 to 30 parts by weight of the amine is used per 100 parts by weight of the azo pigment. The fatty acid and/or rosin or its derivatives is used in an amount in the range of from 0.1 to 0.5 equivalent based on the amine. Furthermore, from 0.5 to 50, preferably from 2 to 20, parts by weight of the resin containing carboxyl groups and having an acid value of at least 50 is used per 100 parts by weight of the amine. The amine forms a salt or salts with the fatty acid, rosin or derivatives thereof, or with the COOH-containing resin. It is desirable to employ the amine in excess with respect to the equivalent of the carboxyl groups of the COOH-containing resin, in order to allow from 1 to 7 parts by weight of free amine to remain, based on 100 parts by weight of the pigment. Where no free amine is present, the flowability of the resulting ink is generally poor.

In practice, the amine, fatty acid and/or rosin or derivative thereof and the COOH-containing resin can be admixed in the following manner. The amine, fatty acid and/or rosin or derivative thereof, and the COOH-containing resin may be added to prior to, during or after the coupling reaction for preparing an azo pigment suitable for use in a gravure printing ink and they may be added one at a time or separately. In a preferred embodiment, the fatty acid and/or rosin or derivative thereof is added to the coupler component but the amine and COOH-containing resin are added after the completion of the coupling reaction.

The slurry of the azo pigment which contains an amine, fatty acid and/or rosin or derivative thereof and COOH-containing resin is normally heated with agitation, after which it is rendered alkaline, generally with a pH in the range of from 7 to 11, preferably from 9 to 10, filtered, washed with water and dried.

When a thus-obtained azo pigment in accordance with the present invention is employed in a printing ink, the ink shows considerably improved gloss and flowability and a lesser degree of aging discoloration than prior-art counterparts and also exhibits good printability.

Further, when an azo pigment in accordance with the present invention is used to make a gravure printing ink, no ink penetration occurs even when applied onto cheap paper which has little or no surface coating, and generally enables duplex printing to be effected on such cheap paper.

The following Examples further illustrate the present invention. Herein, parts are expressed by weight, unless the context otherwise requires.

EXAMPLE 1

Ninety parts of acetoacetanilide were dissolved in 2,500 parts of water, to which were added 40 parts of caustic soda flakes. To the mixture was added an alkaline solution of 12 parts of caprylic acid, followed by agitation for 30 minutes. Thereafter, 90 parts of a 90% acetic acid solution was gradually added to the mixture. To the resulting coupler component was added, over a period of 120 minutes, a solution of 63 parts of 3,3'-dichlorobenzidine which had been tetrazotized by a known method. After the completion of the coupling reaction, a dilute acetic acid solution containing 25 parts of laurylpropylenediamine was added to the slurry of the pigment, which was then agitated at room temperature for 2 hours. Thereafter, 150 parts of a 25% caustic soda solution was added to the slurry and the pH of the slurry was adjusted to 9, to which was then added an alkaline solution containing 17 parts of styrene-maleic acid resin (number average molecular weight: about 10,000; acid value: 150), followed by agitation for 1 hour and thereafter heating the same to 80° C. The resulting slurry was filtered and washed, and the resulting pigment paste was dried at about 80° C. and ground into powder to obtain a pigment in accordance with the present invention.

EXAMPLE 2

Into 2,500 parts of water were dissolved 105 parts of acetoacet-p-anisidide and 40 parts of caustic soda flakes, to which was added an alkaline solution of 13 parts of stearic acid. The mixture was agitated for 30 minutes and then with 90 parts of a 90% acetic acid solution were gradually added. To the resulting coupler component was added, over a period of 120 minutes, a solution of 63 parts of 3,3'-dichlorobenzidine which had been tetrazotized in a known manner. After the completion of the coupling reaction, a dilute acetic acid solution containing 22 parts of stearylpropylenediamine was added to the slurry of pigment, followed by agitation at room temperature for 2 hours. Thereafter, 150 parts of a 25% sodium hydroxide solution were added to the slurry and the pH of the slurry was adjusted to 9, to which was further added an alkaline solution containing 18 parts of a rosin-modified maleic acid resin (number average molecular weight: about 50,000; acid value: 160), followed by agitation for 1 hour and then heating to 80° C. The slurry was then filtered and washed to obtain a pigment paste. The paste was dried at about 80° C. and rendered into a powder form to yield a pigment in accordance with the present invention.

EXAMPLE 3

Ninety parts of acetoacetanilide and 40 parts of caustic soda flakes were dissolved in 2,500 parts of water, to which was then gradually added 90 parts of a 90% acetic acid solution. To the thus-prepared coupler component was added, over a period of 120 minutes, a solution containing 63 parts of 3,3'-dichlorobenzidine which had been tetrazotized in a known manner. After the completion of the coupling reaction, a dilute acetic acid solution containing 22 parts of stearylpropylenediamine was added to the pigment slurry, to which were further added on alkaline solution containing 9 parts of caprylic acid and an alkaline solution containing 17 parts of a styrene-maleic acid resin (number average molecular weight: 100,000; acid value: 150), followed by agitation at room temperature for 2 hours. The pigment slurry was filtered and washed to obtain a pigment paste, and the paste was dried and ground into powder to obtain a pigment in accordance with the present invention.

EXAMPLE 4

Example 1 was repeated, except that an alkaline solution containing 15 parts of lauric acid was used instead of caprylic acid, thereby obtaining a pigment in accordance with the present invention.

EXAMPLE 5

Example 1 was repeated, except that an alkaline solution containing 13 parts of pelargonic acid was used instead of caprylic acid, thereby obtaining a pigment in accordance with the present invention.

EXAMPLE 6

Example 3 was repeated, except that an alkaline solution containing 15 parts of rosin was used instead of caprylic acid, thereby obtaining a pigment in accordance with the present invention.

REFERENCE EXAMPLE 1

Ninety parts of acetoacetanilide were dissolved in 2,500 parts of water, to which was added 40 parts of caustic soda flakes. To the mixture was added an alkaline solution containing 9 parts of stearylamine, followed by agitation for 30 minutes. Then, 90 parts of a 90% acetic acid solution was gradually added to the mixture. To the resulting coupler component was added, over a period of 120 minutes, a solution of 63 parts of 3,3'-dichlorobenzidine which had been tetrazotized in a known manner. After the completion of the coupling reaction, the resulting slurry of pigment was combined with a dilute acetic acid solution containing 22 parts of stearylamine and agitated for 2 hours at room temperature. Then, the slurry was heated to 80° C. and admixed with 150 parts of a 25% caustic soda solution and, after adjusting the pH of the mixture to 9, the slurry was filtered and washed to obtain a pigment paste. The paste was dried at about 80° C. and ground into powder to obtain a pigment, referred to hereinafter as the pigment of Reference Example 1.

REFERENCE EXAMPLE 2

Ninety parts of acetoactanilide were dissolved in 2,500 parts of water, to which was added 40 parts of caustic soda flakes. The mixture was then combined with an alkaline solution containing 12 parts of lauric acid and agitated for 30 minutes. Thereafter, 90 parts of a 90% acetic acid solution was gradually added to the mixture. To the resulting coupling component was added, over a period of 120 minutes, a solution of 63 parts of a 3,3'-dichlorobenzidine which had been tetrazotized in a known manner. After the completion of the coupling reaction, the pigment slurry was combined with a dilute acetic acid solution containing 22 parts of stearylamine and agitated at room temperature for 2 hours. Then, the slurry was heated to 80° C. and admixed with 150 parts of a 25% caustic soda solution. After adjusting the pH to 9, the pigment slurry was filtered and washed. The resulting pigment paste was dried at about 80° C. and rendered into a powder form to yield a pigment, referred to hereinafter as the pigment of Reference Example 2.

COMPARATIVE TESTS

The pigments obtained in Examples 1 to 6, the pigments Reference Example 1 and of Reference Example 2 and an untreated pigment were tested, to compare their adaptability and suitability for use in gravure printing ink. The gravure printing ink was prepared by mixing together 40 parts of petroleum resin, 50 parts of toluene and 10 parts of each sample pigment and then well dispersed in a paint conditioner. Each ink was tested immediately after its formulation and also after being subjected to accelerated aging at 60° C. for 50 hours.

A. Flowability

Measured by a BM-type rotary viscometer (made by Tokyo Keiki Co., Ltd.). The results are shown in Table 1.

TABLE 1

| Ink | Immediately after formulation of ink | After accelerated aging |
|---|---|---|
| Ink made with the untreated pigment | 910 cps | 18,000 cps |
| Ink made with the pigment of Example 1 | 150 | 740 |
| Ink made with the pigment of Example 2 | 325 | 3,050 |
| Ink made with the pigment of Example 3 | 150 | 2,400 |
| Ink made with the pigment of Example 4 | 320 | 3,600 |
| Ink made with the pigment of Example 5 | 165 | 590 |
| Ink made with the pigment of Example 6 | 250 | 3,400 |
| Ink made with the pigment of Reference Example 1 | 480 | 11,100 |
| Ink made with the pigment of Reference Example 2 | 350 | 4,000 |

B. Hue

Immediately after formulation of the inks and also after their accelerated aging, the inks were each applied onto a paper sheet to a film thickness of 20μ by use of a bar coater and, after drying, differences in hue among the ink films were visually observed.

| Ink made with the untreated pigment | Not discolored |
| Ink made with the pigments of Examples 1 to 6 and Reference Example 2 | Scarcely discolored. |
| Ink made with the pigment of Reference Example 1 | Considerably discolored. |

C. Ink Penetration

Each ink was applied immediately after its formulation onto four types of cheap paper available under the commercial names of Ⓕ Iris (product of Honshu Paper Co., Ltd.), Super A for textbook (product of Jujo Paper Co., Ltd.), Toku Gravure (product of Jujo Paper Co., Ltd.), and Shin Prism (product of Daishowa Paper Mfg. Co., Ltd.), by use of a bar coater to a film thickness of 20μ, after which the ink penetration of the opposite side was visually observed. The results are shown in Table 2.

TABLE 2

| Ink | Ⓕ Iris | Super A for Text-book | Toku Gra-vure | Shin Prism |
|---|---|---|---|---|
| Ink made with the untreated pigment | x | x | x | x |
| Ink made with the pigment of Example 1 | o | o | o | o |
| Ink made with the pigment of Example 2 | o | o | o | o |
| Ink made with the pigment of Example 3 | o | o | o | o |
| Ink made with the pigment of Example 4 | o | o | o | o |
| Ink made with the pigment of Example 5 | o | o | o | o |
| Ink made with the pigment of Example 6 | o | o | o | o |
| Ink made with the pigment of Reference Example 1 | x | x | x | x |
| Ink made with the pigment of Reference Example 2 | x | x | x | x | o No ink penetration.
x Ink penetration.

The inks made with the untreated pigment, pigments of Example 1-6 and pigments of Reference Examples 1 and 2 were each applied immediately after formulation onto a sheet of the cheap paper (Ⓕ Iris) to a film thickness of 20μ by use of a bar coater to measure the difference in color, ΔE, between the applied surface and the opposite surface by means of a color-difference meter (product of Nippon Bunko K.K.). The results are shown in Table 3.

TABLE 3

| Ink | ΔE (Greater ΔE indicates lesser penetration) |
|---|---|
| Ink made with the untreated pigment | 38.1 |
| Ink made with the pigment of Example 1 | 41.1 |
| Ink made with the pigment of Example 2 | 40.5 |
| Ink made with the pigment of Example 3 | 40.2 |
| Ink made with the pigment of Example 4 | 40.0 |
| Ink made with the pigment of Example 5 | 40.7 |
| Ink made with the pigment of Example 6 | 40.1 |
| Ink made with the pigment of Reference Example 1 | 35.5 |
| Ink made with the pigment of Reference Example 2 | 34.7 |

D. Gloss

Inks obtained just after formulation and after accelerated aging were each adjusted in viscosity (to 13 seconds as measured by the Zahn Cup No. 3), and applied onto a sheet by a printer to measure the gloss by the use of a gloss meter (product of Toyo Rika Seisakusho, angle of incidence: 60°). The results are shown in Table 4.

TABLE 4

| Ink | Immediately after formulation of ink | After accelerated aging |
|---|---|---|
| Ink made with the untreated pigment | 53.7% | 37.2% |
| Ink made with the pigment of Example 1 | 65.8 | 58.8 |
| Ink made with the pigment of Example 2 | 66.9 | 57.0 |
| Ink made with the pigment of Example 3 | 63.8 | 56.4 |
| Ink made with the pigment of Example 4 | 67.5 | 57.8 |
| Ink made with the pigment of Example 5 | 62.5 | 57.3 |
| Ink made with the pigment of Example 6 | 65.6 | 57.2 |
| Ink made with the pigment of Reference Example 1 | 62.5 | 52.7 |
| Ink made with the pigment of Reference Example 2 | 67.2 | 57.9 |

As is apparent from the above test results, gravure printing inks made with the pigments of Examples 1 to 6 and in accordance with the present invention are far better in flowability and gloss, not only immediately after the formulation of the inks but also after the accelerated aging, than those made with the untreated pigment or the known pigments treated with fatty amine alone (Reference Example 1) or with fatty acid (Reference Example 2). Inks in accordance with the present invention show a much reduced degree of aging discoloration and have been found to be very advantageous from the viewpoint of color controllability compared with the known amine-treated pigments.

It should be noted that similar results were obtained using nitrocellulose-based and rosin-based gravure ink varnishes. Furthermore, the pigments according to the present invention were found to enable the preparation of paints and oil-based inks of excellent gloss and flowability.

What is claimed is:

1. A method of producing an azo pigment, which method comprises treating 100 parts by weight of an azo pigment with:
   1-30 parts by weight of an amine;
   0.1-0.5 equivalents, based on said amine, of:
   (i) a fatty acid;
   (ii) a rosin or rosin derivative having a molecular weight of less than 2000; or
   (iii) a mixture of (i) and (ii); and
   0.5-50 parts by weight of a carboxyl group-containing resin having a number average molecular weight in the range of from 2000 to 150,000 and an acid value of at least 50.

2. A method according to claim 1, wherein the amine is selected from monoamines having the general formula:

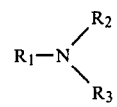

in which $R_1$ represents an alkyl or substituted alkyl group containing from 8 to 24 carbon atoms and $R_2$ and $R_3$ represent, independently, a hydrogen atom or an alkyl group containing from 1 to 14 carbon atoms; and from diamines having the general formula:

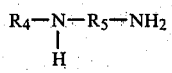

in which $R_4$ represents an alkyl or substituted alkyl group containing from 8 to 24 carbon atoms and $R_5$ represents an alkylene group containing from 1 to 4 carbon atoms.

3. A method according to claim 1, wherein the fatty acid has the general formula $R_6$—COOH, in which $R_6$ represents an alkyl or substituted alkyl group containing from 6 to 24 carbon atoms.

4. A method according to claim 1, wherein the resin containing carboxyl groups is a synthetic resin having an acid value in the range of from 100 to 200, or a partially esterified product thereof.

5. A method according to claim 1, wherein the starting azo pigment is prepared by subjecting a coupling component and a diazo component to a coupling reaction, and the fatty acid and/or rosin or the derivative thereof is added to the components before, during or after the coupling reaction.

6. A method according to claim 1, 2, 3, 4 or 5, wherein the amine is employed in excess with respect to the equivalent of the carboxyl groups of the resin containing carboxyl groups, so as to allow from 1 to 7 parts by weight of free amine to remain, based on 100 parts by weight of the starting azo pigment.

7. An azo pigment produced by treating 100 parts by weight of an azo pigment with:
   1-30 parts by weight of an amine;
   0.1-0.5 equivalents, based on said amine, of:
   (i) a fatty acid;
   (ii) a rosin or rosin derivative having a molecular weight of less than 2000; or
   (iii) a mixture of (i) and (ii); and
   0.5-50 parts by weight of a carboxyl group-containing resin having a number average molecular weight in the range of from 2,000 to 150,000 and an acid value of at least 50.

8. A gravure printing ink containing an azo pigment in accordance with claim 7.

9. A paint containing an azo pigment in accordance with claim 7.

10. An oil-based ink containing an azo pigment in accordance with claim 7.

11. A method for producing a pigment comprising:
   (a) diazotizing an aromatic amine,
   (b) reacting the diazotized aromatic amine with, in admixture, a coupling agent and a member selected from the group consisting of:
      (i) fatty acids of the formula $R_6$—COOH wherein $R_6$ is alkyl of 6 to 24 carbon atoms,
      (ii) rosin and rosin derivatives of a molecular weight less than 2000, and
      (iii) mixtures of (i) and (ii), and
   (c) after completion of the coupling reaction of step (b), admixing 100 parts by weight of the reaction product with (iv) 0.5 to 50 parts by weight of a carboxyl group-containing resin having an acid value of at least 50 and a number average molecular weight of 2000 to 150,000 and (v) 1 to 30 parts by weight of an amine, said member (i), (ii) or (iii) being present in the amount of from 0.1 to 0.5 equivalents based on the amine.

12. A pigment produced by the process of claim 11.